United States Patent [19]

Chen et al.

[11] Patent Number: 5,663,470
[45] Date of Patent: Sep. 2, 1997

[54] "HETEROGENEOUS LEWIS ACID-TYPE CATALYSTS"

[75] Inventors: Frank Joung-Yei Chen, Edison, N.J.; Herve Cheradame, Paris, France; Jon Edmond Stanat, Westfield, N.J.; Gerard Rissoan, Saint-Martin D'Heres, France

[73] Assignee: Exxon Chemical Patents Inc., Linden, N.J.

[21] Appl. No.: 493,222

[22] Filed: Jun. 20, 1995

Related U.S. Application Data

[63] Continuation of Ser. No. 64,688, May 20, 1993, abandoned.
[51] Int. Cl.$^6$ .................. C07C 2/08; C07C 2/14
[52] U.S. Cl. .................. 585/520; 585/502; 585/523
[58] Field of Search .................. 585/502, 520, 585/523

[56] References Cited

U.S. PATENT DOCUMENTS

| | | | |
|---|---|---|---|
| 3,255,167 | 6/1966 | Thomas | 260/88.2 |
| 3,539,633 | 11/1970 | Piasek et al. | 260/570.5 |
| 3,629,150 | 12/1971 | Addy | 252/442 |
| 3,649,229 | 3/1972 | Otto | 44/73 |
| 3,721,632 | 3/1973 | Miller et al. | 252/442 |
| 3,748,318 | 7/1973 | Olechowski | 260/93.5 |
| 3,925,495 | 12/1975 | Rodewald | 260/666 P |
| 3,984,352 | 10/1976 | Rodewald | 252/436 |
| 4,112,011 | 9/1978 | Kolombos | 260/683.15 R |
| 4,116,880 | 9/1978 | Olah | 252/429 R |
| 4,235,756 | 11/1980 | Slaugh | 252/463 |
| 4,288,649 | 9/1981 | McCaulay | 585/533 |
| 4,306,105 | 12/1981 | Abernathy et al. | 585/533 |
| 4,311,613 | 1/1982 | Pellegrini et al. | 252/429 R |
| 4,311,864 | 1/1982 | Pellegrini, Jr. et al. | 585/530 |
| 4,582,818 | 4/1986 | De Clippeleir et al. | 502/231 |
| 4,642,301 | 2/1987 | Sikkenga | 502/231 |
| 4,719,190 | 1/1988 | Drago et al. | 502/64 |
| 4,798,667 | 1/1989 | Drago et al. | 208/117 |
| 4,929,800 | 5/1990 | Drago et al. | 585/744 |
| 5,260,500 | 11/1993 | Shiraki et al. | 585/524 |

FOREIGN PATENT DOCUMENTS

| | | |
|---|---|---|
| 0 273 627 A2 | 6/1988 | European Pat. Off. . |
| 2428056 | 1/1980 | France .................. C08F 4/64 |
| 49-005949 | 1/1974 | Japan .................. B01J 27/10 |
| 719098 | 11/1954 | United Kingdom .......... C08F 210/12 |
| 2001662 | 2/1979 | United Kingdom . |
| 2 001 662 | 7/1979 | United Kingdom . |

OTHER PUBLICATIONS

Sket et al., J. Makromol. Sci.–Chem., A19(5), pp. 643–652 (1983).
Neckers et al., J. Am. Chem. Soc. 94(26), pp. 9284–9285 (1972).
Y.A. Sangalov et al., Translated from Doklady Akademii Nauk, SSSR vol. 265 No. 3, pp.671–674 (1982).
M. Hino et al., Chem. Lett. (1980, 963).
K. Tanabe et al., Successful Design of Catalysts, pp. 99–111, T. Inui Ed., Elsevier Sci. Publish. Amsterdam (1988).
Collomb et al., in Europe. Polym. J., 16(2), pp. 1135–1144 (1980).
Marek et al., Makromol. Chem. Symp. 13/14, 443–455 (1988).
Cationic Polymerization of Olefins: A Critical Inventory, Kennedy, Joseph P., John Wiley & Sons, New York, pp. 37–53 (1975).
Carbocationic Polymerization, Kennedy, Joseph P., John Wiley & Sons, New York, pp. 36–63, (1982).

Primary Examiner—Ponnathapura Achutamurthy
Attorney, Agent, or Firm—Harvey L. Cohen

[57] ABSTRACT

A solid state insoluble salt catalyst system for the carbocationic polymerization of olefin monomer in the presence of a polar or non-polar reaction medium, which comprises (a) solid state catalyst component comprising at least one salt of a strong acid and a carbocationically active transition metal selected from Groups III A, IV A, V A and VI A of the Periodic Table of Elements, wherein said salt is insoluble in the reaction medium; and (b) cocatalyst component effective for promoting the carbocationic polymerization.

15 Claims, No Drawings

"HETEROGENEOUS LEWIS ACID-TYPE CATALYSTS"

This is a continuation of application Ser. No. 08/064,688, filed May 20, 1993, abandoned.

TECHNICAL FIELD

This invention relates to catalysts which are suitable for use in the polymerization of olefin monomers. More particularly, the invention relates to solid state, heterogeneous .Lewis Acid-type catalysts which are active to induce the carbocationic polymerization of monoolefins in polar or non-polar reaction media, which are insoluble in the polymerization reaction medium, and which result in minimal catalyst consumption and polymer contamination.

BACKGROUND OF THE INVENTION

Among the most powerful initiators for carbocationic polymerization of monoolefins are the Lewis Acids such as, for example, boron trifluoride and trichloride, aluminum trichloride, triethyl aluminum, diethyl aluminum chloride, ethylaluminum dichloride, titanium tetrachloride, antimony pentafluoride, and the like. Such carbocationic polymerization catalysts have many advantages, including high yield, fast reaction rates, good molecular weight control, and utility with a wide variety of monomers. However, conventional carbocationic polymerization processes typically employ Lewis Acid catalysts in unsupported form. Hence, these catalysts, typically, cannot be recycled or reused in a cost effective manner. In addition, these catalysts typically are at least partially soluble in the reaction media employed in conventional carbocationic polymerization processes and generally give rise to interactions which lead to partial complexation, dissolution and possible catalyst consumption. Use of these catalysts also results in at least some polymer contamination, thereby requiring various cleanup operations.

In a typical carbocationic polymerization process, such as the carbocationic polymerization of isobutylene, a catalyst feedstream in a liquid or gaseous form and a monomer feedstream are fed simultaneously into a conventional reactor. In the reactor, the streams are intermingled and contacted under process conditions such that a desired fraction of the monomer feedstream is polymerized. Then, after an appropriate residence time in the reactor, a discharge stream is withdrawn from the reactor. The discharge stream contains polymer, unreacted monomer and catalyst. In order to recover the polymer, the catalyst and unreacted monomer must be separated from this stream. Typically, there is at least some residue of catalyst in the polymer which cannot be separated. After separation, the catalyst is typically quenched and neutralized. The quenching and neutralization steps tend to generate large quantities of waste which typically must be disposed of as hazardous waste.

The recycling or reuse of Lewis Acid catalysts used in polymer processes is difficult because of the chemical and physical characteristics of these catalysts. For example, most Lewis Acid catalysts are non-volatile and cannot be distilled off; and some Lewis Acid catalysts are gaseous, such as $BF_3$. The gases can be recycled and reused, but with considerably difficulty, by utilizing gas-liquid separators and compressors.

Accordingly, it would be desirable to avoid using gaseous, liquid or soluble Lewis Acid catalysts of this type and to employ a solid, heterogeneous catalyst on which initiation could take place, and which is insoluble in the polymerization reaction medium such that it will not be consumed during the polymerization process and such that it can be recovered from the reaction system by filtration.

The problem in the search for suitable solid state Lewis Acid catalysts is linked with the fact that heterogeneous catalysts typically are less reactive than homogeneous catalysts, since such solid state, heterogeneous catalysts are active only at their surface, i.e., any active chemicals located inside the mass or body of such catalysts are prevented from initiating the desired polymerization reaction since they cannot physically contact the monomers being polymerized.

Even so, certain solid state catalysts have been studied for use in the carbocationic polymerization of olefins. For example, Sket et al (B. Sket et al, J. Makromol. Sci.-Chem., A19(5), 643 (1983)) studied supported catalyst systems comprising boron trifluoride complexed with the aromatic rings of crosslinked poly(styrene) and poly(vinylpyridine). Similarly, Neckers et al (D. C. Neckers et al, J. Am. Chem. Soc. 94(26), 9284 (1972)) studied complexes between aluminum trifluoride and crosslinkedpoly(styrene)-divinylbenzene, and Chung et al (in copending application Serial No. 723,130, filed Jun. 28, 1991, U.S. Pat. No. 5,288,677,) disclosed the use of Lewis Acid catalyst systems comprising a Lewis Acid, preferably based on metals from Group III A, IV B and V B of the Periodic Table of Elements, supported on a functionalized thermoplastic polymer such as polypropylene-co-1-hexenyl-6-ol.

The concept of performing cationic polymerizations of 1-olefins in the presence of supported Lewis acid catalysts has been studied by other workers as well. See, for example, Y. A. Sangalov et al, Dokl. Akad. Nauk. SSSR, 265.(3), 671 (1982). In all these cases, it can be considered that the catalysts are at least partially soluble in the reaction medium, but that they are immobilized due to the fact that they are complexed to an aromatic nucleus or to a functional group borne on a polymer support. A disadvantage of immobilized Lewis Acid catalysts of this type is that the reaction complexation involved in the immobilization of the Lewis Acid on the polymer support is more or less reversible and that the Lewis acid can be released from the support and into the polymerization products, even if the release process is slow.

There have been several attempts made to support Lewis Acid catalysts on the surface of inorganic substrates such as silica gel, alumina, graphite and clay. Although these approaches are somewhat successful in recycling the Lewis Acid catalysts, there are several disadvantages associated with their use. One particularly strong disadvantage is that these approaches to supported catalysts generally produce only low molecular weight oligomers. Another disadvantage is that the catalysts (supported on inorganic substrates) typically leach out during the reaction since the catalysts tend to not be fixed firmly to the supporting substrates.

U.S. Pat. No. 3,255,167 discloses olefin polymerization in the presence of reduced titanium halide supported on gamma-alumina. The catalyst is prepared by impregnating gamma alumina with titanium tetrachloride and subjecting the impregnated composition to reducing conditions, for example, bypassing hydrogen gas through the impregnated alumina under elevated temperature conditions.

U.S. Pat. No. 3,721,632 discloses a catalyst comprising a metal halide based on metals of Group I A, I B, II B, III B and VIII A on a support such as diatomaceous earth, charcoal, alumina, silica, or silica- alumina.

U.S. Pat. No. 4,112,011 discloses a catalyst comprising gallium compounds on a suitable support such as aluminas, silicas and silica-aluminas.

U.S. Pat. No. 4,116,880 discloses a catalyst comprising a fluorinated graphite support having certain Lewis Acids bonded thereto. The Lewis Acids are selected from the halides of the metals of Group II A, III A, IV B, V A, V B or VI B.

U.S. Pat. Nos. 4,288,649, 4,306,105, 4,582,818 and 4,642,301 disclose halided alumina catalysts which are useful for the various hydrocarbon conversion reactions, as well as for the polymerization of olefins. The catalysts typically are prepared by contacting an alumina support with a halogenating agent such as chlorine gas, thionyl chloride or phosgene at elevated temperatures.

U.S. Pat. No. 3,629,150 discloses catalysts suitable for polymerizing isobutene, wherein the catalysts are prepared by reacting dehydrated silica having silanol groups with aluminum alkyl, and then with a hydrogen halide or with an alkyl halide.

U.S. Pat. Nos. 3,925,495, and 3,984,352 and British Patent Application GB 2,001,662 A disclose catalysts consisting of graphite having a Lewis Acid intercalated in the lattice thereof.

U.S. Pat. No. 4,235,756 discloses a catalyst comprising porous gamma alumina impregnated with an aluminum hydride.

U.S. Pat. Nos. 4,719,190, 4,798,667 and 4,929,800 disclose hydrocarbon conversation and polymerization catalysts prepared by reacting a solid adsorbent containing surface hydroxyl groups with certain Lewis Acid catalysts in halogenated solvent. The only disclosed adsorbents are inorganic; namely, silica alumina, boron oxide, zeolite, magnesia and titania.

In all cases where a Lewis Acid is supported on an inorganic support, however, there is a risk either of leaching of the solid catalyst from the support or of loss of activity of the catalyst due to the reaction (or interaction) responsible for the fixation of the active species on the support.

It is known that some solids exhibit Lewis acidity so that it is possible to initiate carbocationic polymerization on their surface. For example, solid superacids Such as $SO^{2-}/Fe_2O_3$ or $SO_4^{2-}/TiO_2$ were reported to be active for the polymerization of alkyl vinyl ethers (M. Hino et al, Chem. Lett. (1980, 963). However, it seems that these catalysts owe their activity to the presence of sulfur atoms with covalent SO double bonds (K. Tanabe et al, Successful Design of Catalysts, p. 99, T. Inui Ed., Elsevier Sci. Publish. Amsterdam (1988)). Polymerization catalysts of this type tend to lose their activity, and more importantly they are active at too high a temperature to be used for the polymerization of olefin monomers such as isobutylene and 1-butene. Moreover, the fact that such Superacid, catalysts might effectively initiate vinyl ether polymerization does not necessarily imply that they might actively initiate the polymerization of other olefin monomers, such as 1-olefins, since the 1-olefins generally are less reactive that vinyl ethers.

U.S. Pat. No. 4,116,880, which has been discussed hereinabove, also discusses superacid catalysts which are supported, for example, on fluorinated alumina, on inert polyfluorinated polymer supports such as polytetrafluoroethylene (Teflon), or on fluorinated polycarbon (coke).

European Patent No. 273,627, discloses that granular aluminum trichloride was found to be active as a polymerization catalyst. It was also disclosed by Collomb et al, in Europ. Polym. J., 16(2), 1135 (1980), that certain transition metal perchlorates and trifluoromethanesulfonates were active for the cationic polymerization of isobutylene. However, the Collomb et al investigation of hererogenous catalystssystems was limited to salts of metals of the first triad of Group VIIIa, i.e. Fe, Ni and Co, and of Groups I A, I B, II A, II B, and III B. It was also noted by Collombet al that water was detrimental to the polymerization initiating activity.

Marek et al (M. Marek et al, Makromol. Chem. Symp. 13/14, 443 (1988)) reported that the combination of ferric chloride with boron trichloride, titanium tetrachloride or vanadium oxychloride proved to be active for catalyzing the polymerization of olefins. However, Marek et al specified that the activity only concerns polymerization in solution initiated by the soluble fraction of the various initiator systems.

Lewis Acids useful as catalysts in carbocationic processes as well as carbocationically polymerizable monomers, and, the polymers produced from such processes are disclosed and described in the following publications: 1) *Cationic Polymerization of Olefins: A Critical Inventory*, Kennedy, Joseph P., John Wiley & Sons, New York (1975), and, 2) *Carbocationic polymerization*, Kennedy, Joseph P., John Wiley & Sons, New York (1982).

In spite of the advances made in the field of polymerization catalysis, there has been a continuous search for catalysts having high efficiency which can be recycled or reused in cationic polymerization processes. The present invention was developed pursuant to this search.

SUMMARY OF THE INVENTION

In accordance with one aspect of the present invention, there is provided a solid state heterogeneous Lewis Acid catalyst which is active for various hydrocarbon conversion reactions, including, in particular, carbocationic olefin polymerization reactions, and which is insoluble in the solvents typically employed in such reactions.

In another aspect, the invention provides a process for polymerizing a variety of monomers into homopolymers and copolymer, e.g., polyalkenes, by contacting the monomers with the solid state insoluble catalysts of this invention under carbocationic polymerization conditions in the presence of a polar or preferably non-polar gaseous or liquid reaction medium. The monomers which may be polymerized according to this aspect of the invention include those having unsaturation which are conventionally polymerizable using carbocationic Lewis Acid catalyst polymerization technique. s, such as, for example, olefins characterized by the presence in their structure of the group $>C=CH_2$.

Yet another aspect of the present invention provides a process for alkylating an organic substrate with alkylating agent by contacting a mixture of substrate and alkylating agent in the presence of the herein-described solid state, insoluble Lewis Acid catalyst under alkylation conditions.

The substrate to be alkylated can be, for example, olefin, alkane, alkyl halides, and mixtures, and the alkylating agent can be olefin, alkane, alkyl halide, aromatic hydrocarbon, hydroxyaromatic hydrocarbon and mixtures; subject to the proviso that the alkylating agent is different from the substrate employed, e.g., if the substrate is an olefin, the alkylating agent is not an olefin.

The solid state, insoluble catalysts and processes of the present invention offer a number of advantages over conventional cationic catalysts and polymerization processes.

A significant advantage of such catalysts is that they are stable and do not leach or otherwise deposit free Lewis Acid into the reaction medium or, more importantly, into the polymer product. Another advantage is that the present catalysts are usable for multiple polymerization cycles (in the context of a batch process) without regeneration, resulting in substantial cost savings, as well as the elimination of significant amounts of hazardous waste typically generated in conventional Lewis Acid processes. Not only can the solid state, insoluble Lewis Acid catalysts of the present invention be employed for multiple polymerization cycles, or on a continuous basis for extended polymerization times, but they can also be recovered quite readily from the polymerization products when such recovery is necessary or desirable. Another surprising and unexpected advantage of the present invention is that cationic polymerization processes, utilizing the present heterogeneous catalysts, can typically be operated, depending upon the desired molecular weight of the polymer, at relatively higher temperatures compared to polymerization processes using conventional Lewis Acid catalysts. For example, conventional carbocationic polymerization processes for polybutene require temperatures in the range of −10° C. to +10° C. to produce polymers having $\overline{M}_n$ of about 500 to 3,000, thus requiring extensive refrigeration systems which are costly to operate. The processes of the present invention can be run at temperatures as high as about +40° C., with temperatures on the order of −10° to about +30° C. being typical. Thus, use of the present Lewis Acid catalyst provides an economic advantage relative to the catalyst of the prior art.

DETAILED DESCRIPTION OF THE PREFERRED EMBODIMENT

The novel solid state, insoluble catalysts of the present invention can be used to polymerize a variety of monomers into homopolymers and copolymers, e.g., polyalkenes. The monomers include those having unsaturation which are conventionally polymerizable using carbocationic Lewis Acid catalyst polymerization techniques, and monomers which are the equivalents thereof. The terms cationic and carbocationic are used interchangeably herein. Olefin monomers useful in the practice of the present invention are polymerizable olefin monomers characterized by the presence of one or more ethylenically unsaturated groups (i.e., <C=C>); that is, they can be straight or branched: monoolefinic monomers, such as vinyl ethers, ethylene, propylene, 1-butene, isobutylene, and 1-octene, or cyclic or acyclic conjugated or non-conjugated dienes.

Suitable olefin monomers are preferably polymerizable terminal olefins; that is, olefins characterized by the presence in their structure of the group >C=CH$_2$. However, polymerizable internal olefin monomers (sometimes referred to in the patent literature as medial olefins) characterized by the presence within their structure of the group

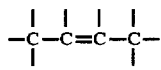

can also be used to form polymer products. When internal olefin monomers are employed, they normally will be employed with terminal olefins to produce polyalkenes which are interpolymers. For purposes of the invention, when a particular polymerized olefin monomer can be classified as both a terminal olefin and an internal olefin, it will be deemed to be a terminal olefin. Thus, 1,3-pentadiene (i.e., piperylene) is deemed to be a terminal olefin for purposes of this invention.

Preferred monomers used in the method for forming a polymer in accordance with the present invention are preferably selected from the group consisting of alpha-olefins and typically C$_3$–C$_{25}$ alpha olefins. Suitable alpha-olefins may be branched or straight chained, cyclic, and aromatic substituted or unsubstituted, and are preferably C$_3$–C$_{16}$ alpha-olefins. Mixed olefins can be used (e.g., mixed butenes).

The alpha-olefins, when substituted, may be directly aromatic substituted on the 2-carbon position (e.g., moieties such as CH$_2$=CH—Ø— may be employed). Representative of such monomers include styrene, and derivatives such as alpha-methyl styrene, para-methyl styrene, vinyl toluene and its isomers.

In addition, substituted alpha-olefins include compounds of the formula H$_2$C=CH—R—X wherein R represents C$_1$ to C$_{23}$ alkyl, preferably C$_1$ to C$_{10}$ alkyl, and X represents a substituent on R and can be aryl, alkaryl, or cycloalkyl. Exemplary of such X substituents are aryl of 6 to 10 carbon atoms (e.g., phenyl, naphthyl and the like), cycloalkyl of 3 to 12 carbon atoms (e.g., cyclopropyl, cyclobutyl, cyclohexyl, cyclooctyl, cyclodecyl, cyclododecyl, and the like) and alkaryl of 7 to 15 carbon atoms (e.g., tolyl, xylyl, ethylphenyl, diethylphenyl, ethylnaphthyl, and the lime). Also useful are bicyclic, substituted or unsubstituted olefins, such as indene and derivatives, and bridged alpha-olefins of which C$_1$–C$_9$ alkyl substituted norbornenes are preferred (e.g., 5-methyl-2-norbornene, 5-ethyl-2-norbornene, 5-(2'-ethylhexyl)-2-norbornene, and the like).

Illustrative non-limiting examples of preferred alpha-olefins are propylene; 1-butene, isobutene, 1-pentene, 1-hexene, 1-octene, and 1-dodecene.

Dienes suitable for purposes of the present invention can be straight chain, hydrocarbon diolefins or cycloalkenyl-substituted alkenes having about 6 to about 15 carbon atoms, for example:

A. straight chain acyclic dienes, Such as 1,4-hexadiene and 1,6-octadiene;

B. branched chain acyclic dienes, such as 5-methyl-1,4-hexadiene; 3,7-dimethyl-1,6-octadiene; 3,7-dimethyl-1,7-octadiene; and the mixed isomers of dihydromyricene and dihydro-ocinene;

C. single ring cyclic dienes, such as 1,3-cylcopentadiene; 1,4-cyclohexadiene; 1,5-cyclo-octadiene and 1,5-cyclododecadiene;

D. multi-ring cyclic fused and bridged ring dienes, such as tetrahydroindene; methyl-tetrahydroindene; dicyclopentadiene; bicyclo-(2.2.1)-hepta-2,5-diene; alkenyl, alkylidene, cycloalkenyl and cycloalkylidene norbornenes, such as 5-methylene-2-norbornene, 5-isopropylidene-2-norbornene, 5-(4-cyclopentenyl)-2-norbornene, 5-cyclohexylidene-2-norbornene, and 5-vinyl-2-norbornene;

E. cycloalkenyl-substituted alkenes, such as allyl cyclohexene, vinyl cyclooctene, allyl cyclodecene, vinyl cyclododecene.

Of the non-conjugated dienes typically used, the preferred dienes are dicyclopentadiene, methyl cyclopentadiene dimer, 1,4-hexadiene, 5 methylene-2-norbornene, and 5-ethylidene-2-norbornene. Particularly preferred diolefins are 5-ethylidene-2-norbornene and 1,4-hexadiene.

The polymers and copolymers which can be manufactured by the process of the present invention are those which can be manufactured by a carbocationic polymerization process and include but are not limited to polyalkenes, such as polyisobutene, poly(1-butene), polystyrene, ethylene alpha-olefin copolymers, and the like. The term copolymer as used herein is defined to mean a polymer comprising at least two different monomer units.

In particular, the solid state, insoluble catalysts of the present invention are especially useful for manufacturing polyisobutene and poly(1-butene) from feedstreams containing butene monomers. It is especially preferred to use refinery feed streams containing $C_4$ monomers, commonly referred to as Raffinate I and Raffinate II.

The Lewis Acid-type catalysts according to the invention, which are insoluble in the polar and non-polar solvents typically employed in the carbocationic polymerization of alpha-olefins, comprise the solid state, insoluble salts of strong acids, of transition metals, known as the early transition metals, of Groups III A, IV A, V A and VIA of the Periodic Table of Elements.

As used in this specification and claims, the term "strong acid" is meant to define acids as strong as or stronger than hydrochloric acid, under the same conditions employed in context with the hereindescribed invention. Among the preferred strong acids are hydrochloric acid, hydrofluoric acid, hydrobromic acid, sulfuric acid, perchloric acid, trifluoromethanesulfonic acid, fluorosulfonic acid and nitric acid; and among the preferred salts are the halides (except iodides), sulfates, perchlorates, trifluoromethanesulfonates, nitrates and fluorosulfonates of a selected transition metal.

The transition metals contemplated for use in the present invention include yttrium of Group III A, zirconium and hafnium of Group IV A, niobium and tantalum of Group V A and molybdenum and tungsten of Group VIA.

Typical of the solid state, insoluble salt catalysts useful in the practice of the present invention are those having the formula $M_aX_b$, as illustrated in the Table, wherein M is selected from yttrium, zirconium, hafnium, niobium, tantalum, molybdenum and tungsten; X is an anionic residue from a strong acid; and "a" and "b" are integers as necessary to satisfy the valence of M.

TABLE

| M | X | a | b |
|---|---|---|---|
| Y | Cl, Br, F | 1 | 3 |
| Y | $ClO_4$ | 1 | 3 |
| Zr | $SO_4$ | 1 | 2 |
| Zr | $NO_3$ | 1 | 2 |
| Zr | $F_3CSO_3$ | 1 | 4 |
| Hf | $FSO_3$ | 1 | 4 |
| Hf | Cl, Br, F | 1 | 4 |
| Nb | $ClO_4$ | 1 | 5 |
| Nb | Cl, Br, F | 1 | 5 |
| Ta | Cl, Br, F | 1 | 5 |
| Ta | $SO_4$ | 2 | 5 |
| Mo | $NO_3$ | 1 | 6 |
| Mo | $F_3CSO_3$ | 1 | 6 |
| W | Cl, Br, F | 1 | 6 |

The solid state, insoluble catalyst salts of the present invention may be used singly or in combination with a proton donating activator or cocatalyst. The cocatalysts include materials known in this art such as water, alcohols, Bronsted Acids, for example, anhydrous HF or HCl, organic acids such as trifluoromethane sulfonic acid, and alkyl halides, for example, benzyl chloride or tertiary butyl chloride. In certain cases the cocatalyst may be selected from Lewis acids, such as a boron trifluoride, boron trichloride, titanium tetrachloride, diethylaluminum chloride, dichloroethylaluminum, vanadium oxytrichloride, antimony trichloride or antimony pentafluoride, provided that the solid state transition metal salt catalyst remains insoluble in the reaction medium at all times during the polymerization reaction. Moreover, since water has been found to be a preferred cocatalyst, there is no need for the catalyst salts, the monomer feedstream or the reactor to be completely dried before use.

The carbocationic polymerization process of the present invention may be carried out in a polar or, preferably, non-polar gas or liquid reaction medium as a continuous, semi-continuous or batch process. Suitable polar solvents which may be used as the polymerization reaction medium include, for example, methyl chloride, dichloromethane, ethyl chloride or nitromethane or the like, whereas suitable non-polar solvents include, for example, carbon tetrachloride, hexane, heptane, cyclohexane, benzene, toluene, and more generally the linear or branched, saturated or unsaturated hydrocarbon solvents which can be found in the stream of monomers obtained from various cracking processes. Generally speaking, however, since there is a risk of limited solubility of the catalyst salts in polar solvents, the use of non-polar solvents is preferred.

The reactors which may be utilized in the practice of the present invention include conventional reactors and equivalents thereof such as batch reactors, stirred tank reactors, fluidized bed reactors, and continuous tank or tubular reactors and the like. As previously mentioned, the process may be continuous, batch or semi-continuous or combinations thereof.

The reactor will contain sufficient amounts of the solid state insoluble salt (heterogeneous) catalyst of the present invention effective to catalyze the polymerization of the monomer containing feedstream such that a sufficient amount of polymer having desired characteristics is produced. The reaction conditions will be such that sufficient temperature, pressure and residence time are maintained effective to maintain the reaction medium in the liquid state and to produce the desired polymers having the desired characteristics.

Typically, the catalyst to monomer ratio utilized will be those conventional in this art for carbocationic polymerization processes. In the practice of the present invention, the catalyst monomer ratio is selected based on the particle size of the solid state, insoluble salt catalyst. Generally speaking, since the amount of catalyst which contacts the monomer in the polymerization process is a function of the surface area of the salt catalyst, the finer the particle size of the salt catalyst, the lesser the amount of catalyst that need be used. Conversely, when relatively larger catalyst particles are used, relatively larger amounts of catalyst are used relative to the amounts of monomer being polymerized. In the practice of the present invention the mole ratio of the active salt to the monomer typically will be about $1/10,000$ to about $1/5$, more typically about $1/1,000$ to about $1/10$, and preferably about $1/100$ to about $1/20$. This mole ratio will be calculated in the usual way despite the fact that the catalyst is heterogeneous and that its activity is a function of the surface of the catalyst particle.

Typically, the solid state, insoluble salt catalyst will have a mean particle size on the order of about 1 μm to about 10 mm, although larger or smaller catalyst particles may be employed. In preferred aspects of this invention, catalyst having an average particle size of from about 10 μm to about 1 mm, e.g., from 50 μm to about 500 μm is preferred.

The reaction temperature typically will be maintained at about 50° C. to about −30° C., more typically about 40° C. to about −20° C. and preferably about 30° C. to about −10° C. The reaction pressure will typically be about 200 k PA to about 1600 k PA, more typically about 300 to about 1200, and preferably about 400 to about 1000.

The monomer feedstock stream to this process may be at least one pure or mixed monomer feedstream or combinations thereof. Preferably, the monomer feedstream may be mixed with solvents such as hexane, methylene dichloride and the like. A preferred feedstock to this process may be a pure or mixed refinery butene stream containing one or more of 1-butene, 2-butene, (cis and trans), and isobutene. The preferred feedstocks (preferred on an availability and economic basis) are available from refinery catalytic crackers and steam crackers. These processes are known in the art. The butene streams typically contain between about 6wt. % to about 50 wt. % isobutylene together with 1-butene, cis- and trans-2-butene, isobutane and less than about 1 wt. % butadiene. One particularly preferred $C_4$ feedstream is derived from refinery catalytic or steam cracking processes and contains about 6–45wt. % isobutylene, about 25–35wt. % saturated butanes and about 15–50wt. % 1- and 2-butenes. Another preferred $C_4$ feedstream is referred to as Raffinate II characterized by less than about 6 wt. % isobutylene. The monomer feedstream is typically substantially free of any impurity which is adversely reactive with the catalyst under the polymerization conditions.

It is contemplated that this process may be used to polymerize and copolymerize various monomers from pure or mixed feedstreams such as isobutenes from pure or mixed streams (containing other butenes); n-butenes from streams containing small amounts of isobutenes (e.g., less than about 5wt. %); and sequentially isobutene from a mixed stream, and then n-butenes. It is also contemplated that this process may be used to copolymerize various monomers including 1-butene, ethylene and hexene.

Other design parameters such as recycle rate and % diluents are matters of choice in this instance and may be readily determined by one having ordinary skill in chemical engineering.

A material acting as a cocatalyst (or promoter) may optionally be added to a monomer feedstock before that feed is introduced to a reactor or it may be added separately to the reactor, e.g., to the catalyst bed. As has been pointed out above, a variety of conventional cocatalysts or equivalents can be used including water; inorganic acids such as hydrogen halides; lower alcohols; compounds having the formula ROH and RX wherein X=halides and R=$C_2$-$C_{24}$ secondary or tertiary alkyl; organic acids such as carboxylic acids and sulfonic acids and the like. For example, gaseous, anhydrous HCl, may be employed as a cocatalyst. The HCl will be employed in a catalytically effective amount, which amount will generally range from about 50 to 5,000 ppm by weight of the monomer feed, preferably 50 to 500 ppm (e.g., 70 to 200 ppm) by weight of the monomer feed when the monomer feed comprises >5 wt. % isobutylene, and preferably from about 100–5,000 ppm (e.g., 400–3,000 ppm) by weight when the feed comprises n-butenes and <5wt. % isobutylene. If anhydrous HCl is added to the feedstream containing isobutene, t-butyl chloride is formed before contact with the solid catalyst. This has been found to promote the polymerization of the isobutene. Water, in a catalytic amount, may be added to the feedstock. However since trace amounts of water significantly promote the carbocationic polymerization of olefin monomers according to this invention, water typically will be present in the monomer feedstreams and on the solid state salt catalyst unless significant efforts to exclude water are made. This ability for even trace amounts of water to promote the polymerization processes of the present invention is an additional, unexpected advantage over the prior art, since the presence of water in prior art processes often has shown a tendency to cause physical deterioration of the catalyst with time. Accordingly, prior art processes preferably have been conducted in the absence of water.

Alcohols, such as the lower alkanols (e.g., methanol), may also be added as a cocatalyst. As has been pointed out above, the monomer feed need not be anhydrous, and the reaction mixture need not be anhydrous.

The order of contacting the monomer feedstream, catalyst, cocatalyst and solvent is not critical to this invention. Accordingly, the catalyst and cocatalyst can be added to the reactor before or after adding the monomer feedstream and solvent. Alternatively, the catalyst and monomer feedstream can be added before or after adding the cocatalyst and solvent. However, while the order of adding the various materials to the reactor is not deemed to be critical to the practice of this invention, it has been found that more favorable reaction rates are achieved, in cases where the polymerization reaction is carried out in the presence of a non-polar reaction medium, when the order of addition to the reactor is: catalyst, followed by cocatalyst, followed by solvent, followed by monomer feedstream.

The characteristics of the polymeric product of the present process will be dependent upon the monomer feedstream, the solid state salt catalyst, the optional cocatalyst, and the reaction conditions that are employed. Typically, the number average molecular weight, $\overline{M}_n$, of the polymeric product will range from about 200 to about 1,000,000, more typically about 500 to about 100,000 and preferably about 500 to about 10,000 gm/mole. The molecular weight distribution ($\overline{M}_w/\overline{M}_n$) typically will range from about 1.2 to about 10, more typically about 1.3 to about 5, and preferably about 1.5 to about 4.

The product mixture may be withdrawn from the reactor and subsequently treated (e.g., by depressuring into a suitable gas/liquid separation drum or other vessel) for separation of gaseous components therefrom (e.g., unreacted monomer such as isobutene, butene butane, and isobutane). If desired, these separated gases can be compressed, cooled and recycled to the feed inlet to the tubular reactor, although the need for such recycling is minimized or avoided by use of the process of this invention in view of the high olefin conversions which are obtainable. A portion of the liquid reactor effluent can be recycled to the feed to dilute the content of the monomers in the feed to the reactor, if necessary. Preferably, the monomers fed to the tubular reactor are substantially free of monomers recycled from the tubular reactor effluent. Therefore, the monomer feedstream is preferably contacted with the catalyst in the process of this invention on a once-through basis.

In addition to polymerization processes, the solid state, insoluble salt catalysts of the present invention also may be used in various other hydrocarbon conversion processes, including alkylation processes, isomerization processes, hydrogenation processes, oxyhalogenation processes and oxidative dehydration processes.

As is known in the art, alkylation may be simply described as the addition or insertion of an alkyl group into a substrate moecule. Of particular interest is the alkylation of aromatic, hydroxy aromatic, olefin, alkyl halide and alkane substrates and mixtures thereof. The hydroxy aromatic and aromatic compounds include, but are not limited to, toluene, xylene, benzene and phenol. Suitable alkylating agents include olefin, alkane, alkyl halide and mixtures thereof. The composition of each class of alkylating agent is as described in conjunction with the corresponding substrate class of compounds subject to the proviso that the alkylating agent class be different from the substrate class employed.

The hydroxy aromatic substrate compounds useful in the preparation of the alkylated materials of this invention include those compounds having the formula:

Ar—(OH)$_z$ wherein Ar represents

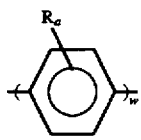

and z is an integer from 1 to 2, w is an integer from 1–3, a is 1 or 2 and R=$C_1$–$C_{24}$ alkyl.

Illustrative of such Ar groups are phenylene, biphenylene, naphthalene and the like.

The aromatic substrate compounds useful in the preparation of the alkylated materials of this invention include those compounds having the formulas:

Ar—R$_a$ and (Ar—R$_a$)$_w$ wherein Ar represents:

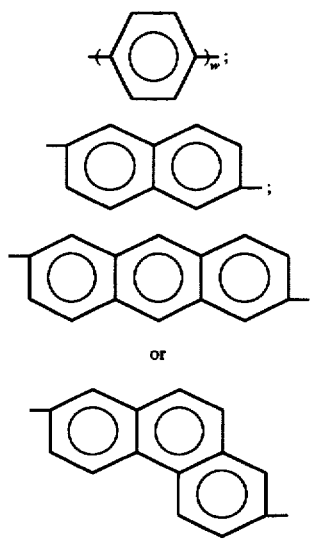

wherein a is one or two; R is $C_1$–$C_{24}$ alkyl, $C_3$–$C_{24}$ cycloalkyl, $C_6$–$C_{18}$ aryl, $C_7$–$C_{30}$ alkylaryl, OH, or H; and w is 1–3.

Illustrative of such Ar groups are benzene, phenylene, biphenylene, naphthalene, and anthracene.

The alkane substrate which can be alkylated using the processes of the present invention include those having the formula $C_nH_{2n+2}$ including but not limited to butane, ethane, propane, methane, heptane, heptane, octane, nonane, decane and the like.

The alkyl halide substrate will typically have the formula $R^8X_r$ wherein $R^8$=$C_1$–$C_{24}$ alkyl, $C_3$–$C_{24}$ cyclic, $C_6$–$C_{18}$ aryl, or $C_7$–$C_{30}$ alkyaryl and X=halide including Cl, F, Br and I, and r is a number from 0 to 4. Examples of alkyl halides include t-butyl chloride, ethyl chloride, n-butyl chloride and 1-chlorohexane.

The olefin substrate useful in the preparation of the alkylated materials of this invention, and which also may be alkylated, are known in the art and include those compounds having 2 to 200 carbon atoms. The olefins may be monomers, oligomers or polymers including copolymers. Non-limiting examples which are illustrative of such compounds include ethylene, propylene, butene, $C_2$–$C_{24}$ mono or diolefin, polybutene, poly-n-butene, polypropylene, low molecular weight polyethylene, ethylene alpha-olefin copolymers, and combinations thereof and oligomers derived from $C_2$–$C_{24}$ olefins.

The selected olefins, alkanes, alkyl halides, aromatic or hydroxy aromatic compounds are contacted with a suitable alkylating agent in the presence of a catalytically effective amount of at least one acidic alkylation catalyst under conditions effective to alkylate the substrate selected. The alkylation catalyst comprises the immobilized catalysts of the present invention. Also useful as catalysts are preformed complexes (or complexes formed in situ) of the immobilized catalyst with aromatics such as benzene, toluene and the like.

The substrate and alkylating agent generally will be contacted under reaction conditions, including mole ratio, temperature, time and catalyst ratio sufficient to alkylate the substrate. The substrate generally will be contacted in a molar ratio of from about 0.1 to 10 preferably from about 1 to 7, more preferably from about 2 to 5, moles of the substrate per mole of the alkylating agent. Conventional ratios of alkylating agent typically will be used. The ratio typically will be about 0.5 to 2:1, more typically about 0.8 to about 1.5:1, and preferably about 0.9 to about 1.2:1. The selected catalyst can be employed in widely varying concentrations. Generally, the catalyst will be charged to provide at least about 0.001, preferably from about 0.01 to 0.5, more preferably from about 0.1 to 0.3, moles of catalyst per mole of substrate charged to the alkylation reaction zone. Use of greater than 1 mole of the catalyst per mole of substrate is not generally required. The reactants can be contacted with the present solid state insoluble salt catalyst employing any conventional solid-liquid contacting techniques, such as by passing the reactants through a fixed bed of catalyst particles. The upper limit on the moles of catalyst employed per mole of substrate compound is not critical.

The temperature for alkylation can also vary widely, and will typically range from about 20° to 250° C., preferably from about 30° to 150° C., more preferably from about 50° to 80° C.

The alkylation reaction time can vary and will generally be from about 1 to 5 hours,.although longer or shorter times can also be employed. The alkylation process can be practiced in a batchwise, continuous or semicontinuous manner.

Alkylation processes of the above types are known and are described, for example, in U.S. Pat. Nos. 3,539,633 and 3,649,229, the disclosures of which are hereby incorporated by reference.

As previously mentioned, the heterogeneous, solid state, insoluble catalysts and processes of the present invention offer a number of advantages over conventional carbocationic catalysts and polymerization processes.

A particularly significant advantage of the heterogeneous catalyst and process of the present invention is that the catalyst is usable for prolonged periods of time resulting in significant cost savings, as well as the elimination of significant amounts of hazardous waste typically generated in conventional Lewis Acid processes.

Another surprising and unexpected advantage of the present invention is that the polymerization process can be operated in the presence of water without degrading the catalyst.

Another advantage of the solid salt catalysts of the present invention is that the catalysts are easy to dispose of in an environmentally advantageous manner.

Yet another advantage of the solid state, insoluble salt catalysts of the present invention is that they can be used in most organic solvents. Although the use of non-polar solvents as the polymerization reaction medium is preferred, the catalysts of this invention do not require that their use be limited to specific solvents, for example, aliphatic hydrocarbon solvents.

And yet another advantage of the insoluble solid state salt catalysts of the present invention is that the polymers produced using these catalysts have little or no catalyst residue.

Polybutenes and other polymers and copolymers in the molecular weight range of 500 to 10,000 prepared in accordance with the process of the present invention are particularly useful as a feedstock for the production of improved lubricating oil dispersants. These disperSants generally comprise the reaction product of polybutenyl ($\overline{M}_n$ of 700 to 10,000) succinic anhydride, or the acid form thereof, with monoamines or polyamines having at least one primary or secondary amino group such as the alkylene polyamines, particularly the ethylene polyamines, the polyoxyalkylene amines, aromatic and cycloaliphatic amines, hydroxyamines, monoaliphatic and dialiphatic substituted amines. Useful dispersants are also formed by reacting monohydric and polyhydric alcohols with the polyisobutenyl succinic anhydride or diacid provided in accordance with this invention and preferred materials are thus derived from polyols having 2 to 6 OH groups containing up to about 20 carbon atoms such as the alkene polyols and alkylene glycols. Also suitable are the polyoxyalkylene alcohols such as polyoxyethylene alcohols and polyoxypropylene alcohols, monohydric and polyhydric phenols and naphthols, ether alcohols and amino alcohols and the like. Borated derivatives of the foregoing dispersants are also useful, especially borated nitrogen containing dispersants resulting from boration with boron oxide, boron halide, boron acids and esters to provide 0.2 to 2.0 weight percent boron in the dispersant. Metals and metal-containing compounds can also form useful dispersants and these are compounds capable of forming salts with the polybutenyl succinic anhydride or acid (using the polybutenes of the present invention). These include metals such as the alkali metals, alkaline-earth metals, zinc, cadmium, lead, cobalt, nickel, copper, molybdenum, in the form of oxides, carboxylates, halides, phosphates, sulfates, carbonates, hydroxides and the like.

Lubricating oil compositions usually will contain dispersants in amounts of from about 1 to 15 weight percent based on the overall weight of the composition. Lubricating oil compositions typically will contain other additives in customary amounts to provide their normal attendant functions such as metal detergents or basic metal detergents, anti-wear additives, anti-oxidants, viscosity modifiers and the like. Dispersants are conventionally packaged and dispensed in the form of solution concentrates containing about 20 to 50 wt. % dispersant in a mineral oil.

The following examples are illustrative of the principles and practice of this invention, although not limited thereto. Parts and percentages where used are parts and percentages by weight, unless specifically noted otherwise.

EXAMPLE 1

In a round flask reactor, provided with a teflonated magnet and connected to a vacuum line, a quantity of 1 g. of anhydrous zirconium tetrachloride (containing trace amounts of water) was introduced under nitrogen. Then, 30 ml of hexane were introduced by condensation under vacuum, followed by 20 ml of isobutylene. The reactor was then rapidly brought to $-10°$ C. and allowed to stand at this temperature for 30 minutes under stirring. The reaction medium was treated with 4 ml of methanol containing 10% (vol/vol) of aqueous ammonia and filtered. Then, 50 ml of hexane, previously distilled, were added. The filtrate contained two liquid phases. The upper phase, containing the product poly(isobutylene) in hexane, was collected and dried by evaporation. The polymerization yield was approximately 100%

Example 1 illustrates the initiating capability of the insoluble salts of strong acids of metals belonging to Group IV A for heterogeneous cationic polymerization.

EXAMPLE 2

In the same system that was used in Example 1, a quantity of $3.1 \times 10^{-3}$ moles (1.0 g.) of anhydrous hafnium tetrachloride (containing trace amounts of water) was introduced under nitrogen. Then, 30 ml of hexane were introduced by condensation under vacuum, followed by 20 ml of isobutylene. The reactor was then rapidly brought to $-10°$ C. and allowed to stand at this temperature for 30 minutes under stirring. The reaction medium was quenched with 4 ml of methanol containing 10% (vol/vol) of aqueous ammonia and filtered. The filtrate was treated in accordance with Example 1. The polymerization yield was approximately 90%.

This example further demonstrates the activity of salts of strong acids and metals of Group IV A as initiators for heterogenous cationic polymerizations.

EXAMPLE 3

In the same system that was used in Example 1, a quantity of $3.1 \times 10^{-4}$ moles (1.1 g) of anhydrous tantalum pentachloride (containing trace amounts of water) was introduced under nitrogen. Then, 30 ml of hexane were introduced by condensation under vacuum, followed by 20 ml of isobutylene. The reactor was then rapidly brought to $-10°$ C. and allowed to stand at this temperature for 30 minutes under stirring. The reaction medium was quenched with 4 ml of methanol containing 10 (vol/vol) aqueous ammonia and filtered. The filtrate was treated according to Example 1. The polymerization yield was approximately 100%.

This example illustrates the utility of an insoluble salt of a strong acid and metal of Group V A as a heterogeneous catalyst for cationic polymerization.

EXAMPLE 4

In the same system that was used in Example 1, a quantity of $3.6 \times 10^{-3}$ moles (1.44 g.) of anhydrous tungsten hexachloride (containing trace amounts of water) was introduced under nitrogen. Then, 30 ml of hexane were added by condensation under vacuum, followed by 20 ml of isobutylene. The reactor was then rapidly brought to $-10°$ C. and allowed to stand at this temperature for 30 minutes under stirring. The reaction medium was quenched with 4 ml of methanol containing i0 % (vol/vol) of aqueous ammonia was filtered. The filtrate was treated according to Example 1. The polymerization yield was 100

This example demonstrates the potential for use as a heterogenous cationic polymerization catalyst of insoluble Salts of strong acids and metals belonging to Group VIA.

EXAMPLE 5

In the reactor system used in Example 1, a quantity of $3.6 \times 10^{-3}$ moles (0.97 g). of anhydrous niobium pentachloride (containing trace amounts of water) was introduced under vacuum. Then, 30 ml of hexane were introduced by condensation under vacuum, followed by 30 ml of isobutylene. The reactor was then rapidly brought to −10° C. and allowed to stand at this temperature for 30 minutes under stirring. The reaction medium was quenched with 4 ml of methanol containing 10% (vol/vol) aqueous ammonia and filtered. The filtrate was treated according to Example 1. The polymerization yield was 11%.

This example further illustrates the activity of insoluble salts of strong acids an metals of Group V A as heterogeneous cationic polymerization catalyst.

EXAMPLE 6

In the same system that was used in Example 1, a quantity of $3.1\times10^{-3}$ moles (0.6 g.) of anhydrous yttrium trichloride (containing trace amounts of water) was introduced under nitrogen. Then, 30 ml of hexane were introduced by condensation under vacuum, followed by 20 ml of isobutylene. The reactor was then rapidly brought to −10° C. and allowed to stand at this temperature 30 minutes under stirring. The reaction medium was quenched with 4 ml of methanol containing 10% (vol/vol) aqueous ammonia was filtered. The filtrate was treated according to Example 1. The polymerization yield was approximately 20%.

This example demonstrates the utility of an insoluble salt of a strong acid and a metal of Group III A as a heterogeneous cationic polymerization catalysts.

EXAMPLE 7

Four grams of hafnium .tetrachloride (containing trace amounts of water) were introduced in a 250 ml reactor connected to a vacuum line. After drying under primary vacuum for 30 minutes, 30 ml of hexane, dried over calcium hydride, were introduced. Then 20 ml of 1-butene (measured at −10° C., after drying over calcium hydride), were introduced. The mixture was stirred at 20° C. for 4 hours. The polymerization medium was quenched by 5 ml of methanol. After filtration and solvent evaporation, a polymerization yield of 100% was measured.

This example demonstrates that a linear 1-olefin, i.e., 1-butene, which is less easily polymerizable than isobutylene, can be polymerized in the presence of insoluble salts of strong acids of metals of Group IV A.

EXAMPLE 8

The procedure of Example 7 was repeated, except that the polymerization time was only 30 minutes. The poly (1-butene) yield was approximately 84%.

What is claimed is:

1. A process for the cationic polymerization of olefin monomer which comprises:

(a) contacting polymerizable olefin, in the presence of a polar or non-polar solvent reaction medium, with a solid state, insoluble, salt catalyst system comprising:

(i) solid state heterogeneous catalyst component comprising at least one salt selected from the group consisting of the salts of a strong acid and a Group III A, Group IV A, Group V A or Group VI A transition metal selected from the group consisting of yttrium, lanthanum, zirconium, hafnium, niobium, tantalum, molybdenum and tungsten, wherein said catalyst component is insoluble in the reaction medium; and (ii) cocatalyst component effective for promoting the carbocationic catalytic activity of said catalyst component; and (b) maintaining contact between said polymerizable olefin monomer, said catalyst component and said cocatalyst component at a temperature and for a period of time sufficient to effect polymerization of said olefin monomer.

2. The process according to claim 1, wherein said cocatalyst component is selected from the group consisting of water, lower alkanols, alkyl halides, inorganic acids, carboxylic acids, sulfonic acids and mixtures thereof.

3. The process according to claim 1, wherein said strong acid is selected from the group consisting of trifluoromethanesulfonic acid, fluorosulfonic acid, sulfuric acid, hydrobromic acid, hydrochloric acid, hydrofluoric acid, perchloric acid and nitric acid.

4. The process according to claim 1, wherein said cocatalyst component is added to the reaction medium before the addition thereto of said olefin monomer.

5. The process according to claim 1, wherein said cocatalyst component is added to the reaction medium after the addition thereto of said olefin monomer.

6. The process according to claim 1, wherein said cocatalyst component is added to the reaction medium simultaneously with the addition thereto of said olefin monomer.

7. The process according to claim 3, wherein said olefin monomer comprises at least one olefin selected from the group consisting of propylene, 1-butene, isobutene, 1-pentene, 1-hexene, 1-octene, 1-decene, styrene and alpha-methylstyrene.

8. The process according to claim 4, wherein said olefin monomer comprises at least one olefin selected from the group consisting of propylene, 1-butene, isobutene, 1-pentene, 1-hexene, 1-octene, 1-decene, styrene and alpha-methylstyrene.

9. The process according to claim 5, wherein said olefin monomer comprises at least one olefin selected from the group consisting of propylene, 1-butene, isobutene, 1-pentene, 1-hexene, 1-octene, 1-decene, styrene and alpha-methylstyrene.

10. The process according to claim 6, wherein said olefin monomer comprises at least one olefin selected from the group consisting of propylene, 1-butene, isobutene, 1-pentene, 1-hexene, 1-octene, 1-decene, styrene and alpha-methylstyrene.

11. The process according to claim 1, wherein the reaction medium comprises a non-polar organic solvent.

12. The process according to claim 7, wherein the reaction medium comprises a non-polar organic solvent.

13. The process according to claim 11, wherein the reaction medium comprises a member selected from the group consisting of hexane, heptane, cyclohexane, carbon tetrachloride, benzene, toluene, and linear or branched, saturated or unsaturated hydrocarbon solvents contained in refinery catalytic or steam cracking process product streams.

14. The process according to claim 12, wherein the reaction medium comprises a member selected from the group consisting of hexane, heptane, cyclohexane, carbon tetrachloride, benzene, toluene, and linear or branched, saturated or unsaturated hydrocarbon solvents contained in refinery catalytic or steam cracking process product streams.

15. The process according to claim 1, wherein the polymerization of the olefin monomer is carried out at a temperature between about −20° C. and +40° C.

* * * * *